United States Patent
Copenhafer et al.

(10) Patent No.: US 6,228,335 B1
(45) Date of Patent: May 8, 2001

(54) PROCESS FOR THE PRODUCTION OF SODIUM CARBONATE CRYSTALS

(75) Inventors: William C. Copenhafer, Yardley, PA (US); David E. Smith, Princeton, NJ (US)

(73) Assignee: FMC Wyoming Corporation, Philadelphia, PA (US)

(*) Notice: Subject to any disclaimer, the term of this patent is extended or adjusted under 35 U.S.C. 154(b) by 0 days.

(21) Appl. No.: 08/987,978

(22) Filed: Dec. 10, 1997

(51) Int. Cl.[7] .............................. C01D 7/00; C22B 26/00
(52) U.S. Cl. ........................ 423/206.2; 423/421; 423/426
(58) Field of Search .............................. 423/206.2, 206.1, 423/426, 421; 23/302 T, 297, 298; 299/4, 5

(56) References Cited

U.S. PATENT DOCUMENTS

| | | |
|---|---|---|
| 2,133,455 | 10/1938 | Keene et al. . |
| 2,267,136 | 12/1941 | Robertson . |
| 2,388,009 | 10/1945 | Pike . |
| 2,625,384 | 1/1953 | Pike et al. . |
| 3,050,290 | 8/1962 | Caldwell et al. . |
| 3,113,834 | 12/1963 | Beecher et al. . |
| 3,119,655 | 1/1964 | Frint et al. . |
| 3,184,287 | 5/1965 | Gancy . |
| 3,246,962 | 4/1966 | Miller . |
| 3,264,057 | 8/1966 | Miller . |
| 3,273,958 | 9/1966 | Peverley . |
| 3,273,959 | 9/1966 | Miller . |
| 3,451,767 | 6/1969 | Saeman et al. . |
| 3,953,073 | 4/1976 | Kube . |
| 4,252,781 | 2/1981 | Fujita et al. . |
| 4,283,372 | 8/1981 | Frint et al. . |
| 4,288,419 | 9/1981 | Copenhafer et al. . |
| 4,519,806 | 5/1985 | Copenhafer et al. . |
| 4,557,910 | 12/1985 | Meadow . |
| 4,652,054 | 3/1987 | Copenhafer et al. . |
| 4,654,204 | 3/1987 | Copenhafer et al. . |
| 4,869,882 | 9/1989 | Dome et al. . |
| 5,043,149 | 8/1991 | Frint et al. . |
| 5,262,134 | 11/1993 | Frint et al. . |
| 5,283,054 | 2/1994 | Copenhafer et al. . |
| 5,396,863 | 3/1995 | Ninane et al. . |
| 5,609,838 | 3/1997 | Neuman et al. . |
| 5,618,504 | 4/1997 | Delling et al. . |
| 5,766,270 | * 6/1998 | Neuman et al. ............... 423/206.2 |

* cited by examiner

Primary Examiner—Steven Bos
(74) Attorney, Agent, or Firm—Trask & Britt; Patrick C. Baker (57) ABSTRACT

A process for the production of soda ash by withdrawing an aqueous mining solution containing dissolved sodium carbonate and at least about 1 wt % sodium bicarbonate from an underground alkali source; stripping $CO_2$ gas from the withdrawn aqueous mining solution, to convert sodium bicarbonate dissolved therein to sodium carbonate; co-crystallizing sodium carbonate monohydrate and sodium sesquicarbonate by evaporation of water from the $CO_2$-stripped aqueous mining solution, without co-crystallization of anhydrous sodium carbonate, to form a slurry of crystalline solids in an aqueous liquor; recovering crystalline solids from the slurry; and calcining the recovered crystalline solids to produce soda ash.

30 Claims, 2 Drawing Sheets

PROCESS FOR THE PRODUCTION OF SODIUM CARBONATE CRYSTALS

BACKGROUND OF THE INVENTION

The present invention relates to a process for the recovery of sodium carbonate from solutions containing sodium carbonate and sodium bicarbonate and, particularly, from solutions obtained from the solution mining of trona ore deposits.

Sodium carbonate, also called soda ash, is an important, high volume chemical produced in the United States and used in the manufacture of glass, chemicals, soaps and detergents and aluminum, as well as in textile processing, petroleum refining and water treatment, among many other uses.

In the United States, almost all sodium carbonate is obtained from subterranean deposits of naturally occurring trona ore. The largest known trona ore deposits in the United States are located in Green River, Wyo. and are typically about 800 to 3000 feet below ground level; these trona ore deposits are actively mined by several companies. Trona ore primarily comprises sodium sesquicarbonate ($Na_2CO_3 \cdot NaHCO_3 \cdot 2H_2O$), and a typical analysis of crude trona ore being mined at Green River, Wyo. is as follows:

| Constituents | Weight Percent (wt %) |
|---|---|
| sodium sesquicarbonate | 90 |
| sodium chloride (NaCl) | 0.1 |
| sodium sulfate ($Na_2SO_4$) | 0.02 |
| organic matter | 0.3 |
| insolubles (clay and shales) | 9.6 |

Trona ore is recovered from these subterranean deposits for further processing into soda ash by conventional mechanical mining techniques, also called dry mining, such as room and pillar and long wall methods or by any of several various solution mining methods. The Green River, Wyo. trona ore deposits are presently being commercially mined by both mechanical and solution mining processes. Mechanical mining methods are relatively costly and leave unrecovered a significant fraction of the trona ore in the beds being mined, so solution mining processes present an economical alternative to mechanical mining.

Solution mining allows the recovery of sodium carbonate values from subterranean trona ore deposits without the need for sinking costly mining shafts and mechanically extracting the ore using a mining crew in the mines. Solution mining can be accomplished by injecting water or other aqueous-based solution via a drilled well hole into a deposit of trona ore, allowing the solution to dissolve as much of the soluble ore as possible, pumping the solution via a drilled well hole to the surface, and processing the solution to recover the dissolved ore values from the solution in the form of sodium carbonate or other related sodium based chemicals. Solution mining methods are also useful for recovery of trona ore from depleted ore deposits that have previously been mechanically mined.

Numerous solution mining techniques have been described in the prior art: see, for example, U.S. Pat. Nos. 2,388,009 of Pike; 2,625,384 of Pike; 3,050,290 of Caldwell et al.; 3,119,655 of Frint et al.; 3,184,287 of Gancy; 3,953,073 of Kube; 4,401,635 of Frint; and 5,043,149 of Frint et al. In these prior art solution mining processes, a primary objective was to maximize solubilization of the trona ore in the mining solvent or to otherwise provide a concentrated solution, or brine, for processing to recover soda ash. These prior art approaches included use of heated aqueous solvents or of sodium hydroxide-containing solvents or fortification of a recovered brine with added alkali values. The resulting highly concentrated solutions could then be more economically processed into soda ash, for example, by using conventional soda ash recovery techniques such as the sesquicarbonate process or the monohydrate process. The sesquicarbonate process and the monohydrate process were originally developed to process mechanically mined trona ore into soda ash, so they do not always necessarily provide the methods best suited for recovering soda ash from solution-mined brines.

The sesquicarbonate process involves dissolution of mechanically mined trona ore in a recycled hot mother liquor containing excess normal carbonate over bicarbonate in order to congruently dissolve the sodium sesquicarbonate in the trona; clarifying and filtering the solution to remove insoluble matter present in the ore; passing the filtrate to a series of vacuum crystallizers to crystallize pure sodium sesquicarbonate as the stable crystal phase, by evaporation of water and cooling; recovering crystallized sodium sesquicarbonate from the crystallizer slurry; recycling the crystallizer mother liquor to dissolve additional crude trona, and calcining the recovered sodium sesquicarbonate crystals at elevated temperature to convert the sesquicarbonate to soda ash.

The monohydrate process was developed in response to the need for a more dense soda ash than that produced by the sesquicarbonate process. In the monohydrate process, mechanically mined trona ore is calcined at elevated temperature to convert it to crude sodium carbonate; the calcined crude sodium carbonate is dissolved in water, the resulting sodium carbonate solution is clarified and filtered to remove insolubles; the clarified filtered solution is then processed in an evaporative crystallizer circuit to remove water and crystallize sodium carbonate monohydrate. The crystallized sodium carbonate monohydrate is recovered and calcined to produce a dense soda ash.

Methods other than the conventional sesquicarbonate process and conventional monohydrate process have been described in the prior art for processing of solution mining liquors or of other similar brines containing alkali values; see, for example, U.S. Pat. Nos. 3,264,057 of Miller, 3,273,959 of Miller; 3,273,958 of Peverley; 5,283,054 of Copenhafer et al.; and 5,609,838 of Neuman et al. These prior art methods are typically complex procedures, involving multiple steps in which various forms of sodium carbonate are crystallized, and these multiple crystallization operations add significantly to the overall economic cost of these soda ash recovery processes.

The present invention provides a process for the production of soda ash that is more direct and economical than the complex crystallization procedures described in the prior art and that may be used with a wide variety of aqueous mining liquors, without the need to fortify such aqueous mining liquors with additional alkali values prior to recovery of the soda ash.

BRIEF SUMMARY OF THE INVENTION

One aspect of the present invention is the production of soda ash by the process of (i) withdrawing an aqueous mining solution containing dissolved sodium carbonate and at least about 1 wt % sodium bicarbonate from an underground alkali source; (ii) stripping $CO_2$ gas from the withdrawn aqueous mining solution, to convert sodium bicarbonate dissolved therein to sodium carbonate; (iii) co-crystallizing sodium carbonate monohydrate and sodium sesquicarbonate from the $CO_2$-stripped aqueous mining solution, without co-crystallization of anhydrous sodium carbonate, by evaporation of water at a temperature of at least about 50° C. to form a slurry of crystalline solids in an aqueous liquor; (iv) recovering crystalline solids from the slurry; and (v) calcining recovered crystalline solids to produce soda ash.

Another aspect of this invention is a process for separating large crystals of sodium carbonate monohydrate, by crystal size separation, from small crystals of sodium carbonate monohydrate and from small crystalline sodium sesquicarbonate in the crystalline solids mixture, produced as described above.

Still another aspect of this invention is a process in which the soda ash produced as described above is introduced into an aqueous medium to recrystallize the soda ash as sodium carbonate monohydrate; and the crystallized sodium carbonate monohydrate is recovered and calcined to produce a dense soda ash product.

BRIEF DESCRIPTION OF THE SEVERAL VIEWS OF THE DRAWINGS

The foregoing "Brief Summary of the Invention," as well as the following detailed description of preferred embodiments, will be better understood when read in conjunction with the appended drawings. For the purpose of illustrating the invention, there is shown in the drawings an embodiment which is presently preferred, it being understood, however, that the invention is not limited to the specific arrangements and instrumentalities disclosed. In the drawings.

DETAILED DESCRIPTION OF THE INVENTION

The soda ash recovery process of the present invention involves the co-crystallization of sodium carbonate monohydrate and sodium sesquicarbonate, without co-crystallization, i.e., co-precipitation, of anhydrous sodium carbonate, using an aqueous mining solution, that contains dissolved sodium carbonate and dissolved sodium bicarbonate and that is preferably a trona-mined solution. Sodium carbonate monohydrate in the co-crystallized mixture is the preferred sodium carbonate species, and the relative amount of sodium carbonate monohydrate produced in the co-crystallization step is enhanced in the process of this invention by stripping $CO_2$ gas from the aqueous mining solution, to convert sodium bicarbonate to sodium carbonate, prior to subjecting the aqueous mining solution to the co-crystallization step.

The soda ash recovery process of this invention may utilize aqueous mining solutions obtained from a variety of alkali sources, provided that the aqueous mining solution contains dissolved sodium carbonate and at least about 1 wt % sodium bicarbonate. The term "aqueous mining solution", as used herein, refers to the solution or brine that is withdrawn or otherwise recovered from a subterranean alkali source, e.g., an ore deposit being solution mined, as contrasted with a "mining solvent" that is introduced via solution mining techniques to the ore deposit to effect dissolution of the ore and thereby produce an "aqueous mining solution". Such aqueous mining solutions are typically (but not necessarily) obtained from solution mining of subterranean deposits of trona ore, using solution mining solvents such as described for prior art solution mining techniques. The process of the present invention is well suited for recovering soda ash from aqueous mining solutions obtained from underground trona ore deposits treated with a mining solvent, such as water or other similar aqueous solvents, that is relatively low in dissolved alkali values. The temperature of the water or other solvent is preferably maintained near the temperature of the trona ore formation being solution mined. For the trona ore deposits located in Green River, Wyo., the temperature of the trona formation may vary from about 20° C. to about 30° C., depending on the depth of the formation, but is most typically about 22° C. to about 27° C.

Nearly saturated solutions obtained from the dissolution of solid trona with an aqueous medium such as water at 20° C. contain about 17 wt % $Na_2CO_3$ and about 4 wt % $NaHCO_3$. These and other weight percentages in this disclosure should be understood to mean percent by weight, based on the total weight of the solution. Small differences in solvent temperatures will not significantly change the equilibrium-saturated composition; e.g., a saturated solution at 30° C. contains about 17 wt % $Na_2CO_3$ and about 4.7 wt % $NaHCO_3$.

The aqueous mining solution typically obtained from solution mining is not completely saturated. At 25° C., a representative aqueous mining solution typically contains about 14 wt % $Na_2CO_3$ and about 4.5 wt % $NaHCO_3$.

It should be recognized, however, that more concentrated aqueous mining solutions or brines may be obtained by heating the mining solvent to elevated temperatures, e.g., above 50° C., or by including sodium hydroxide in the mining solvent. These approaches can add to the recovery costs associated with obtaining an aqueous mining solution but provide improved process efficiency in the soda ash recovery by reducing water evaporation requirements, since the resulting aqueous mining solution has a substantially higher total alkali content as compared to that obtained with ambient temperature water being used as the mining solvent.

The term "total alkali", as used herein, refers to the total weight percent in a solution or mixture of sodium carbonate and sodium bicarbonate, the latter of which (sodium bicarbonate) is expressed in terms of its equivalent sodium carbonate content. For example, an aqueous mining solution containing 14 wt % $Na_2CO_3$ and 4 wt % $NaHCO_3$ would have a total alkali content of 16.5 wt % $Na_2CO_3$, since 4 wt % $NaHCO_3$ corresponds to 2.5 wt % equivalent $Na_2CO_3$.

The aqueous mining solution used in the soda ash recovery process of this invention should contain dissolved sodium carbonate and at least about 1 wt %, and preferably at least about 2 wt %, dissolved sodium bicarbonate. The aqueous mining solution does not need to be saturated with respect to either sodium bicarbonate or sodium carbonate dissolved therein, but less energy is required in the recovery process with solutions that are saturated, or nearly so, with respect to these two components. The aqueous mining solution preferably has a total alkali content from dissolved sodium carbonate and sodium bicarbonate of at least about 8 wt %. More preferably, the aqueous mining solution has at least about 10 wt %, and, most preferably, at least about 15 wt % total alkali content.

The sodium bicarbonate content of the aqueous mining solution is typically in the range of about 2 wt % to about 8 wt % $NaHCO_3$. The sodium carbonate content of the aqueous mining solution is preferably at least about 6 wt % Na2CO3 and more preferably at least about 10 wt % Na2CO3.

The aqueous mining solution used in the process of the present invention may be obtained as the withdrawn or effluent solution from a variety of underground alkali sources. Trona ore is the preferred alkali source for the present invention. The aqueous mining solution may be obtained from a trona ore deposit that is solution-mined with water or with a dilute aqueous solvent containing sodium carbonate and/or sodium bicarbonate or with an aqueous solvent containing sodium hydroxide (e.g., up to about 6 wt % NaOH). A dilute aqueous $Na_2CO_3$- and $NaHCO_3$-containing solvent used as a mining solvent should contain amounts of these two components that are less than their respective concentrations in the resulting aqueous mining solution, to promote dissolution of the ore being solubilized. A dilute aqueous $Na_2CO_3$- and $NaHCO_3$-containing solution useful as a mining solvent will therefore typically contain up to about 12 wt % $Na_2CO_3$ and up to about 3 wt % $NaHCO_3$. The underground ore deposit that is treated to obtain the aqueous mining solution may also contain other $Na_2CO_3$- or $NaHCO_3$-containing minerals such as wegscheiderite (primarily $Na_2CO_3.3NaHCO_3$) or nahcolite (primarily $NaHCO_3$), either alone or in combination with trona.

The aqueous mining solution used in the process of the present invention may be a withdrawn or effluent solution from subterranean alkali sources other than those described above. For example, the withdrawn mining solution could be derived from naturally occurring aquifers or man-made underground water sources that seep into a (formerly) mechanically-mined ore deposit and solubilize alkali values in the residual ore. The withdrawn mining solution could likewise be obtained from a tailings injection system, in which dry-mined ore tailings, i.e., waste solids, are introduced as an aqueous slurry into a subterranean cavity, such as described in U.S. Pat. No. 5,043,149 of Frint et al. Another source of the aqueous mining solution may include a solution mining operation in which ore is dry-mined and dissolved underground and the resulting solution (after insolubles are allowed to settle out) withdrawn for use as aqueous mining solution.

The soda ash recovery process of this invention is noteworthy in that it utilizes an aqueous mining solution, without the need to fortify such solution above ground with dry mined trona ore that is solubilized in such solution. Consequently, supplemental addition of alkali values via dissolution of mechanically mined trona ore or the like in the withdrawn aqueous mining solution can be avoided in the soda ash recovery process of the present invention. If desired, however, the withdrawn aqueous mining solution may also be mixed with other alkali-containing aqueous streams, or even with dry mined ore such as calcined trona ore, but this is not necessary for carrying out the soda ash recovery process of the present invention.

An advantage of the aqueous mining solution used in the recovery process of the present invention is that the clarification and/or filtration requirements are significantly reduced since such solution is typically relatively free of suspended insoluble matter. The insolubles associated with the subterranean trona ore deposit are typically left below ground in the mine or mining cavity, and the withdrawn aqueous mining solution is relatively free of suspended insolubles.

If dry mined ore is solubilized in the aqueous mining solution, the insoluble matter that is normally associated with such mechanically mined ores must be separated from the resulting solution by clarification and/or filtration before the solution is processed according to the present invention. Other drawbacks to the use of mechanically mined trona ore, as a means to supplement alkali values in the withdrawn aqueous mining solution, include the solids handling requirements associated with dry mined ore, e.g., conveying, crushing, dissolution of the ore, and the like, all of which add to the complexity and cost of the overall soda ash recovery. In addition, solutions obtained from the solubilization of dry mined trona ore may also contain organic matter, typically resulting from the insoluble shales present in dry mined ore, and these organic contaminants must be removed prior to recovery of the soda ash product. Use of aqueous mining solutions obtained from solution mining of trona ore in situ generally avoids or minimizes contamination from organics, since such organic contaminants are not solubilized to a great extent and therefore are not present in significant amounts in the withdrawn aqueous mining solution recovered from such cavity.

The aqueous mining solution used in the present invention is typically withdrawn from the underground trona ore deposit or other alkali source ore deposit at about the underground temperature of the subterranean bed being mined, e.g., from about 20° C. to about 30° C. The aqueous mining solution is likewise preferably at or near saturation in its dissolved sodium carbonate and dissolved sodium bicarbonate content with respect to the trona ore. The aqueous mining solution may also contain minor amounts of other minerals dissolved from the trona ore deposit, such as sodium chloride and sodium sulfate.

The concentrations of dissolved sodium chloride and/or sodium sulfate or other soluble salts present in the aqueous mining solution will depend on the respective concentrations of such salts in the ore deposit and in the mining solvent used. The concentrations of sodium chloride and sodium sulfate dissolved in the aqueous mining solution are typically less than about 1 wt % of each, for solution-mined subterranean trona ore formations that have the representative analysis first described above. Other areas of the trona deposit being solution mined in Green River, Wyo. exhibit higher sodium chloride contents and aqueous mining solutions obtained from solution mining of such underground trona ore deposits may contain higher NaCl concentrations.

Aqueous mining solutions containing dissolved sodium chloride in amounts of up to about 8 wt % NaCl, along with dissolved sodium carbonate and sodium bicarbonate, may be processed to recover soda ash according to the present invention. If an NaCl-containing aqueous mining solution is used in the present invention, such solution preferably contains less than about 4 wt % sodium chloride dissolved therein, in order to minimize the amount of mining solution required for the desired soda ash production rate. Likewise, aqueous mining solutions containing dissolved sodium sulfate in amounts of up to about 2 wt % $Na_2SO_4$, preferably no more than about 1 wt % $Na_2SO_4$, along with dissolved sodium carbonate and dissolved sodium bicarbonate, may also be processed according to the present invention. Amounts of sodium chloride and sodium sulfate in excess of these amounts are feasible but generally the quality of the soda ash product deteriorates with such higher impurity levels in the aqueous mining solution.

It should be understood that the co-crystallization of sodium carbonate monohydrate and sodium sesquicarbonate using NaCl-containing and/or $Na2SO_4$-containing aqueous mining solutions is carried out in a manner which avoids co-precipitation of either NaCl or $Na_2SO_4$, so that these contaminants remain solubilized in the crystallizer mother liquor.

The withdrawn aqueous mining solution is subjected to a $CO_2$ gas stripping step in the soda ash recovery process of the present invention to convert at least some of the sodium bicarbonate dissolved therein to sodium carbonate. The $CO_2$ gas stripping step effects removal of $CO_2$ from the aqueous mining solution by the conversion, or decomposition, of sodium bicarbonate dissolved in the mining solution to sodium carbonate, with the consequent evolution of $CO_2$ gas as a by-product. Such decomposition or conversion of sodium bicarbonate to sodium carbonate is desirable since the evolved $CO_2$ gas can be recovered for subsequent reuse, e.g., in carbonation operations. The $CO_2$ gas stripping step also shifts the ratio of sodium carbonate monohydrate to sodium sesquicarbonate co-crystallized in the subsequent crystallization operation in favor of crystallization of sodium carbonate monohydrate.

In the $CO_2$ gas stripping step, sufficient $CO_2$ is preferably stripped from the aqueous mining solution to provide, in the subsequent co-crystallization step, a solids mixture of crystalline sodium carbonate monohydrate and crystalline sesquicarbonate having a total alkali content in which sodium carbonate monohydrate comprises at least about one-quarter of the total alkali content in the crystallized solids. More preferably, sufficient $CO_2$ is stripped from the aqueous mining solution to result in at least about one-half of the total alkali content in the crystallized solids from the co-crystallization step being sodium carbonate monohydrate. In the event that the optional concentration (evaporation) step is employed, the amount of $CO_2$ removed in the $CO_2$ stripping and concentration steps together should be sufficient to meet the alkali content targets specified above.

The $CO_2$ gas stripping step is preferably carried out at a temperature of from about 50° C. to about 140° C., with the operating temperature more preferably being above 90° C. The $CO_2$ gas stripping step may be accomplished as described below.

The aqueous mining solution is preferably preheated before being introduced to the $CO_2$ gas stripper to minimize or prevent condensation of water vapor present in the stripping gas that is introduced to the gas stripper, particularly when steam (as described below) is used as the $CO_2$ stripping gas. Preheating of the aqueous mining solution may be accomplished by conventional methods, such as use of heat exchangers in which hot liquor or steam is used as the heat source. Preheating of the aqueous mining solution may also be accomplished with the use of live steam, either with or without additional heating stages using heat exchangers. The temperature of the aqueous mining solution introduced to the gas stripper is preferably within a temperature range of from about 50° C. to about 140° C., more preferably above about 90° C. and up to about 130° C.

The $CO_2$ gas stripping step is preferably carried out using a stripping gas (inlet gas stream) having a temperature that is at least about 50° C., more preferably at least about 90° C. The stripping gas contacted with the aqueous mining solution is a gas that is predominantly other than carbon dioxide, such as water vapor (steam), air or the like. The inlet gas stream used in the $CO_2$ gas stripping step is preferably a hot water vapor, i.e., steam, from water evaporated within the stripper, or from a downstream concentration step or crystallization step. Air may also be used as the stripping gas, although evaporation of water from the aqueous mining solution during the $CO_2$ gas stripping operation will require additional heat input. If evaporation is to be minimized when using air or the like as a stripping gas, water vapor-containing air or gas, i.e., moist or humid warm air, can be used. Another source for the gas stream for the $CO_2$ gas stripping step is steam from at least one stage of a multiple effect evaporator or crystallizer train, such as may be used to concentrate the aqueous mining solution or crystallize sodium carbonate monohydrate and sodium sesquicarbonate in the present process. Waste steam gas streams from other sources, e.g., a monohydrate soda ash recovery process or a power generation facility, may likewise be used.

The $CO_2$ gas stripping step is preferably carried out using a multi-stage gas-liquid stripping column, by countercurrently contacting the aqueous mining solution with a gas stream in a packed tower or tray (plate) tower. Such towers are operated on a continuous basis and preferably with the gas stream and aqueous mining solution stream being contacted countercurrently. The design and operation of such vapor-liquid contacting equipment is generally well known in the chemical engineering process art, so that further detailed information about the operation and selection of such $CO_2$ gas stripping equipment for use in the process of the present invention is unnecessary.

The extent of the conversion of bicarbonate to carbonate in the $CO_2$ gas stripping step depends on a number of factors, including the temperature, pressure, liquid-to-gas ratio in the stripping device, the $CO_2$ content, if any, of the stripping gas, and the number of effective stages in the stripper. The $CO_2$ gas stripping step is preferably carried out in a manner in which sufficient $CO_2$ is stripped from the aqueous mining solution to convert at least about 10%, and preferably at least about 20% and more preferably at least about 30%, of the sodium bicarbonate in the aqueous mining solution fed to the stripping step to sodium carbonate prior to co-crystallization of sodium carbonate monohydrate and sodium sesquicarbonate.

It should be noted that evaporation of water from the aqueous mining solution is not necessary to effect conversion of bicarbonate dissolved in the aqueous mining solution to carbonate. Nevertheless, concentration of the aqueous mining solution, as described below, is desirable to enhance the amount of bicarbonate converted to carbonate. Such additional conversion of residual sodium bicarbonate dissolved in the aqueous mining solution (that exits from the $CO_2$ gas stripper) is accomplished in the preferred optional concentration step, described below, in which water is evaporated from the aqueous mining solution to increase the concentration of total alkali in the treated aqueous mining solution. During the separate $CO_2$ gas stripping step, it should be noted, there is usually no significant evaporation of water from the aqueous mining solution.

The exiting gas stream from the $CO_2$ stripping step contains the $CO_2$ stripped from the treated aqueous mining solution. A $CO_2$-rich gas may be recovered from the $CO_2$ stripping step, by condensing and separating water from the $CO_2$-containing exit gas stream from the $CO_2$ stripping step. Such $CO_2$-rich gas is a valuable byproduct that may be used for its $CO_2$ content, e.g., in carbonation operations such as converting solubilized carbonate to bicarbonate to produce sodium bicarbonate.

In a preferred embodiment of this invention, the withdrawn aqueous mining solution is concentrated, prior to the co-crystallization step, by evaporation of water without crystallization or precipitation of sodium carbonate or of sodium bicarbonate dissolved therein. The concentration step is preferably carried out by evaporation of water at a temperature of at least about 50° C. This optional, preferred concentration step and the $CO_2$ stripping step may be carried out as continuous sequential operations in which the $CO_2$ stripping step is carried out before the concentration step. Alternatively, the $CO_2$ stripping step and the concentration step may be carried out concurrently, as a single step.

The concentration step may be carried out as a single stage operation or a multiple stage operation, and the concentration processing step may be carried out in many different types of conventional equipment well known to those skilled in the art. Preferably, the concentration step is carried out using mechanical vapor recompression in a single stage evaporator, where the overhead vapors of an evaporator stage are compressed by means of mechanically driven compressors and the compressed vapors are condensed in a heat exchanger to transfer the heat values to the aqueous mining solution being concentrated.

The preferred operation, in which the $CO_2$ gas stripping step is carried out in combination with the evaporative concentration of the stripped aqueous mining solution, provides distinct processing efficiencies and advantages. In this arrangement, the aqueous mining solution is fed to a $CO_2$ gas stripper where the solution is stripped with steam from one or more evaporator stages that is fed as the stripping inlet gas into the $CO_2$ gas stripping column. The aqueous mining solution, preheated prior to being introduced into the $CO_2$ gas stripper, is contacted in the stripping column with the steam, resulting in decomposition of bicarbonate present in the aqueous mining solution and stripping of the evolved carbon dioxide.

The aqueous mining solution exiting from the stripper in this preferred operating embodiment is fed into an evaporator, where the solution is concentrated by heating at elevated temperature to evaporate water and generate steam. Such steam is preferably employed as the inlet stripping gas in the $CO_2$ gas stripper. During evaporative concentration of the aqueous mining solution that exits from the $CO_2$ gas stripper, additional bicarbonate values present in the solution are decomposed. Carbon dioxide gas resulting from the decomposition in the evaporator is present in the steam that is used as the inlet gas stripping stream in the $CO_2$ gas stripper. The inlet gas stream thus becomes more concentrated with respect to $CO_2$ as it passes through the gas stripper, stripping additional $CO_2$ from the aqueous mining solution in the stripper column.

The next step in the soda ash recovery process of this invention involves co-crystallization of sodium carbonate monohydrate and sodium sesquicarbonate from the $CO_2$-stripped aqueous mining solution, without co-crystallization or co-precipitation of anhydrous sodium carbonate. The co-crystallization step is accomplished by evaporation of water to form a crystalline solid slurry in an aqueous liquor, where the stable solid phases in the slurry are sodium carbonate monohydrate and sodium sesquicarbonate.

Crystallization of sodium carbonate monohydrate from the stripped aqueous mining solution, as the preferred co-crystallization product, is desirable for several reasons. First of all, large crystals of sodium carbonate monohydrate may be recovered by size separation techniques from the co-crystallized sodium carbonate monohydrate and sodium sesquicarbonate crystal mixture, to provide sodium carbonate monohydrate that may be calcined to produce dense soda ash. Second, the amount of crystallized sodium sesquicarbonate is likewise reduced, and this reduces the amount of bicarbonate that must be converted to bicarbonate-free forms of sodium carbonate. Calcination of sodium sesquicarbonate in a gas-fired rotary calciner or air-fluidized bed calciner, to convert sodium bicarbonate therein to sodium carbonate and to drive off the two waters of hydration, produces byproduct $CO_2$ that is not easily recovered from the calciner off-gas because its concentration is very dilute (in contrast to the off-gas from the $CO_2$ stripping step of this invention). Conversely, the $CO_2$ stripping step of this invention has the advantage of removing and recovering $CO_2$ during decomposition and conversion of bicarbonate to carbonate, without an energy-intensive ore calcination step such as required in the prior art monohydrate process, in which the bicarbonate in the ore is converted to carbonate at elevated temperature via calcination. Calcination of the crystal mixture is a relatively energy-inefficient process, as compared to achieving the same objective via the $CO_2$ stripping technique in the present invention.

The co-crystallization step of this invention is also advantageous, as compared with prior art soda ash processes such as described in U.S. Pat. No. 5,283,054, since it avoids the step of treating the crystallizer feed with lime, sodium hydroxide or the like, to convert the residual bicarbonate to carbonate; use of lime in such a treatment procedure is less costly than use of sodium hydroxide but requires disposal of an undesirable byproduct, calcium carbonate.

Figure 1:
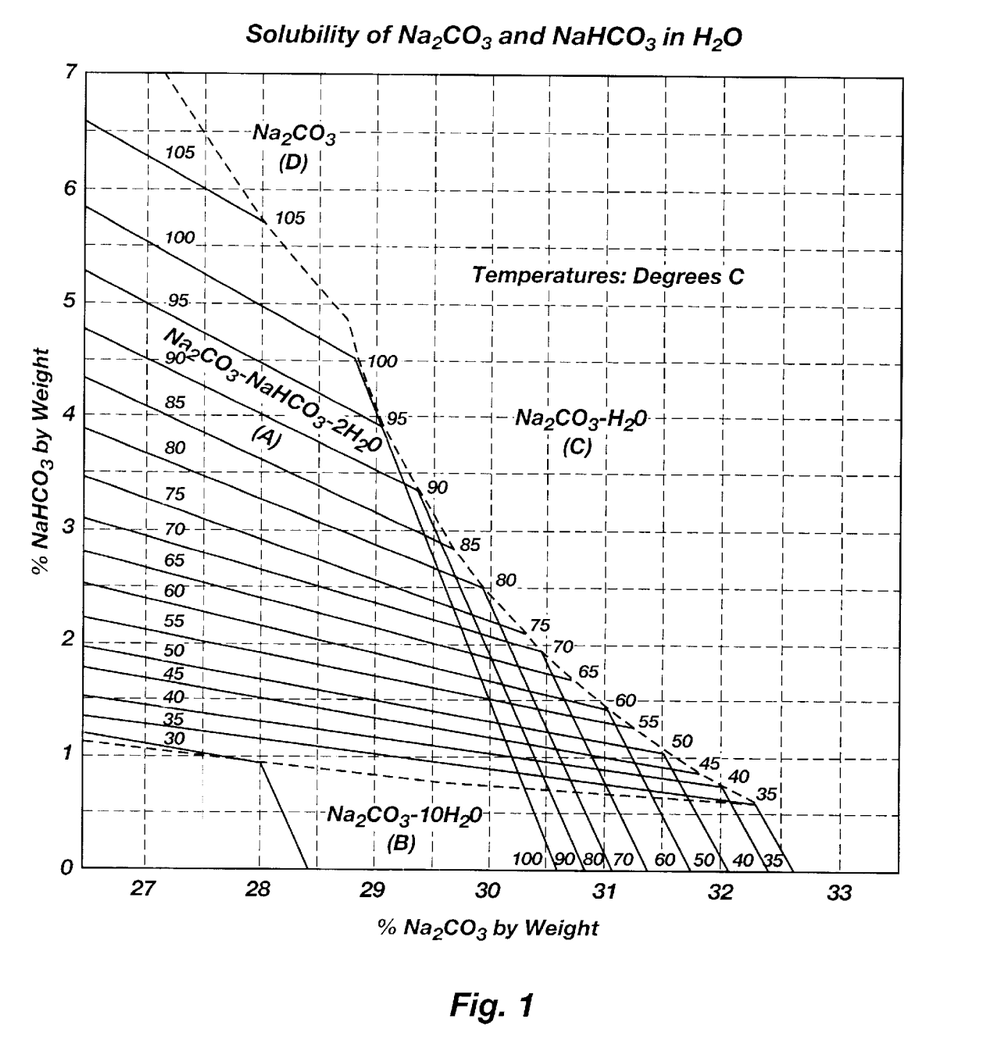
FIG. 1 is a portion of the phase diagram showing the solid phases that are crystallized from aqueous solutions of sodium carbonate and sodium bicarbonate at various temperatures.

The co-crystallization of sodium carbonate monohydrate and sodium sesquicarbonate, without the concurrent co-crystallization of anhydrous sodium carbonate, is best understood by reference to a phase diagram depicting the stable solid phase (or phases) for $Na_2CO_3$- and $NaHCO_3$-containing aqueous solutions. FIG. 1 is a portion of the phase diagram showing the solid phases that are crystallized from aqueous solutions containing sodium carbonate and sodium bicarbonate at various temperatures. The phase diagram shows sodium bicarbonate concentration, expressed as percent by weight and ranging from 0 to 7 wt % $NaHCO_3$ on the Y axis, and sodium carbonate concentrations, expressed as percent by weight and ranging from 26.5 to 33 wt % $Na2CO_3$ on the X axis. The stable solid phases in equilibrium with solutions at various concentrations of sodium carbonate and sodium bicarbonate are shown in the phase diagram: these are noted as sodium sesquicarbonate (A), sodium carbonate decahydrate (B), sodium carbonate monohydrate (C) and anhydrous sodium carbonate (D). Thus, the area (A) is the sodium sesquicarbonate region in which sodium sesquicarbonate is in equilibrium with an aqueous solution of $Na_2CO_3$ and $NaHCO_3$ at any point in area (A). Area (B) is the corresponding sodium carbonate decahydrate region, area (C) is the corresponding sodium carbonate monohydrate region, and area (D) is the corresponding anhydrous sodium carbonate region.

The solid lines running from left to right and on a diagonal in FIG. 1 are temperature isotherms which represent the composition of saturated aqueous solutions of sodium carbonate and sodium bicarbonate at the particular temperature (in degrees Centigrade) indicated. For sodium carbonate and sodium bicarbonate solutions represented by the dashed line between area (A) (where sodium sesquicarbonate is the stable solid phase) and area (C) (where sodium carbonate monohydrate is the stable solid phase), a mixture of sodium sesquicarbonate and sodium carbonate monohydrate crystals is formed when water is evaporated from such a solution on the dashed line between regions (A) and (C). The inflection point in the dashed line, which occurs between the temperature isotherms for 100° C. and 105° C., represents an invariant point at which a mixture of sodium sesquicarbonate, sodium carbonate monohydrate and anhydrous sodium carbonate are formed. On the dashed line above the invariant point, between areas (A) and (D), anhydrous sodium carbonate is co-crystallized along with sodium sesquicarbonate.

In the recovery process of the present invention, the co-crystallization step is carried out such that the composition of the liquor in the evaporative crystallizer is represented by a point along the dashed line between areas (A) and (C), such that the stable solid phase formed is a mixture of crystalline sodium carbonate monohydrate and crystalline sodium sesquicarbonate. The co-crystallization is carried out such that operation of the co-crystallization step does not result in co-crystallization of anhydrous sodium carbonate, i.e., the liquor composition in the crystallizer is not allowed to coincide with the invariant point shown on the phase diagram. Anhydrous sodium carbonate, if precipitated, tends to revert to monohydrate as a result of temperature reductions that may occur prior to separating the mixed crystal mixture from the liquor, and this mixture is difficult to handle, being very cementitious. Likewise, the co-crystallization is carried out under conditions that avoid co-crystallization of sodium carbonate decahydrate, shown as the stable solid phase in region (B).

The phase diagram shown in FIG. 1 is for a system that is free of other salts such as sodium chloride and sodium sulfate. However, even if sodium chloride and/or sodium sulfate are present in minor amounts, the principles explained for the phase diagram shown in FIG. 1 are likewise applicable to the treatment of aqueous mining solutions also containing minor amounts of sodium chloride and/or sodium sulfate.

The co-crystallization step in the process of this invention is preferably carried out at a temperature of at least about 50° C. As is evident from the phase diagram data shown in FIG. 1, temperatures lower than 50° C. can be used for co-crystallization of sodium sesquicarbonate and sodium carbonate monohydrate, but it becomes increasingly more expensive to evaporate water at the associated higher vacuums required to obtain such temperatures.

The co-crystallization temperature is preferably at least about 50° C. but is maintained below a temperature that would yield a composition equivalent to the invariant point, at which anhydrous sodium carbonate is precipitated as an undesirable species along with the desired sodium carbonate monohydrate and sodium sesquicarbonate. The co-crystallization of sodium carbonate monohydrate and sodium sesquicarbonate is more preferably carried out at a temperature of about 70° C. to about 100° C. It should be recognized that the presence of impurities such as NaCl in the feed solution introduced to the crystallizer will typically lower the temperature of the invariant point, at which anhydrous sodium carbonate is precipitated along with the desired sodium carbonate monohydrate and sodium sesquicarbonate solid species. Consequently, as the concentration of NaCl in the crystallizer feed liquor increases, the maximum temperature possible for co-crystallization of only sodium carbonate monohydrate and sodium sesquicarbonate, without the undesirable crystallization of anhydrous sodium carbonate, is lowered.

The co-crystallization may be carried out as a single-stage evaporative crystallization or as a multiple-stage evaporative crystallization. The crystallization is preferably carried out as a continuous operation, in which $CO_2$ stripped aqueous mining solution is continuously introduced to an evaporative crystallizer (or crystallizer train) and the rates of water evaporation, crystallized solids recovery and mother liquor withdrawal from the crystallizer are such as to maintain a steady state for the crystallizer operation.

The aqueous mining solution, as mentioned previously, is preferably stripped of sufficient $CO_2$ during the $CO_2$ stripping step to yield a mixture of crystalline sodium carbonate monohydrate and crystalline sodium sesquicarbonate in the co-crystallization step in which at least about one-quarter of the total alkali content, more preferably at least about one-half, in the crystallized solids is represented by sodium carbonate monohydrate.

The $CO_2$ stripping, optional concentration and co-crystallization steps may be carried out in a single vessel as a means of reducing the capital cost requirements for equipment in the soda ash recovery process of this invention.

Recovery of the resulting crystalline sodium carbonate monohydrate and crystalline sodium sesquicarbonate may be effected by conventional solids liquid separation techniques, such as filtration or centrifugation.

The recovered crystalline solids are calcined to produce soda ash, as described below. The dry crystalline solids mixture may be separated into two or more different crystal size fractions, if desired. For example, the calcined crystalline solids mixture may be screened or air-classified to yield soda ash products having specific crystal sizing and bulk density characteristics.

A particular advantage of the sodium carbonate monohydrate and sodium sesquicarbonate co-crystallization that is carried out in the process of this invention is that the two species of crystals typically exhibit distinctly different crystal size distributions, i.e., a bimodal distribution. The sodium carbonate monohydrate crystals that are formed in the co-crystallization operation generally exhibit a significant fraction or percentage of crystals having a relatively large particle size, unlike the sodium sesquicarbonate crystals formed during the co-crystallization which are relatively small. This fraction of "large" sodium carbonate monohydrate crystals contains crystals that are essentially all sodium carbonate monohydrate, since a majority of the sodium sesquicarbonate crystals are smaller than the "large" sodium carbonate monohydrate crystals.

The large sodium carbonate monohydrate crystals are typically retained on a 40 mesh screen (420 micron), i.e., they are +40 mesh in size, and more preferably, are retained on a 50 mesh sieve screen (297 micron) and most preferably are retained on a 60 mesh sieve screen (250 micron) (U.S. Sieve series). The crystallized sodium sesquicarbonate, on the other hand, generally exhibits a crystal size distribution in which substantially all of the crystals, including the largest sized crystals in the population, pass through a 40 mesh sieve screen, more preferably, through a 50 mesh sieve screen, and most preferably, through a 60 mesh sieve screen.

It is important to recognize that in commercial practice, e.g., where crystal growth modifiers and promoters are commonly used, the resulting crystal sizing may vary from the specific preferred values for sieve sizes noted above; see, e.g., U.S. Pat. Nos. 3,459,497 and 3,705,790 which teach the use of calcium and magnesium to enhance the size and bulk density of crystallized sodium carbonate monohydrate. Likewise, use of crystal growth promoters for sodium sesquicarbonate crystals will affect the specific crystal sizing for this crystal species. Regardless of the specific sieve size that delineates the fraction of large crystals of sodium carbonate monohydrate from the mixed crystal fraction of fine sodium carbonate monohydrate and fine sodium sesquicarbonate, the size separation principles described for separating these crystal size fractions are still applicable.

This difference in particle size distributions between the crystalline sodium carbonate monohydrate and crystalline sodium sesquicarbonate may be used, in a preferred embodiment of the soda ash recovery process of this invention, to recover essentially pure sodium carbonate monohydrate of relatively large crystal size. This may be effected via size separation of the large sodium carbonate monohydrate crystals from the small sodium carbonate monohydrate crystals and from essentially all of the sodium sesquicarbonate crystals, e.g., those crystals passing through a 40 mesh sieve screen (preferably a 50 mesh and more preferably a 60 mesh sieve screen), in the mixture of crystalline solids from the crystallizer slurry in the co-crystallization step. The recovered large crystals of sodium carbonate monohydrate may be calcined, if desired, to produce a dense soda ash product. The remaining smaller crystals, a mixture of sodium sesquicarbonate and small sodium carbonate monohydrate crystals, may be calcined as described below to produce soda ash.

Separation of the large sodium carbonate monohydrate crystals from the smaller sodium carbonate monohydrate crystals and sodium sesquicarbonate crystals may be effected by any of several techniques. One such hydraulic technique involves introducing a slurry of mixed crystals from the crystallizer into a column flotation device in which the slow upward flow of liquid carries with it the small sodium carbonate monohydrate crystals and sodium sesquicarbonate crystals, leaving behind the large sodium carbonate monohydrate crystals that settle at a faster rate because of their larger size. The slurry of large monohydrate crystals is withdrawn from the bottom of the flotation column, and the crystals are then separated from the mother liquor and dried or calcined.

A hydroclone may also be used to provide a partial crystal size separation of the slurried sodium sesquicarbonate and sodium carbonate monohydrate crystals. Wet screening procedures may also be used to effect a separation of the crystals into different size fractions.

Alternatively, the large sodium carbonate monohydrate crystals may be separated from the finer crystals by dry size classification procedures. For example, the mixture of crystalline solids may first be recovered from the crystallizer slurry, e.g., by centrifugation or filtration, and then introduced into a fluidized bed dryer that also functions as a particle size classifier. In the fluidized bed, the crystals are dried to remove free water and separated in the upward flowing gas stream. The upward gas flow separates the small sodium carbonate monohydrate crystals and small sodium sesquicarbonate crystals from the large sodium carbonate monohydrate crystals. A mixture of fine monohydrate and sesquicarbonate crystals is removed from the top of the fluidized bed, and the larger monohydrate crystals are withdrawn from a lower portion of the fluidized bed.

Another size separation approach involves drying (to remove free water) or calcining (to remove hydrated water and/or $CO_2$) the mixture of recovered sodium carbonate monohydrate and sodium sesquicarbonate crystals and then effecting a size separation of the crystalline solids using conventional size classification sieves to separate desired size fractions from the crystal mixture. The recovered dry crystalline solids mixture may be separated into at least two different crystal size fractions. For example, sodium carbonate monohydrate crystals having a relatively coarse particle size, e.g., being retained on a 40-mesh sieve, more preferably, a 50-mesh sieve and most preferably, a 60-mesh sieve, may be separated in relatively pure form from the mixture of smaller sodium carbonate monohydrate crystals and essentially all of the sodium sesquicarbonate crystals.

In the recovery process of this invention, the crystalline solids that are recovered from the slurry of co-crystallized sodium carbonate monohydrate and sodium sesquicarbonate are processed further, to produce soda ash. At least a portion of the recovered crystalline solids are calcined to produce soda ash. It should be understood that this invention includes within its scope a variety of options relating to the calcination of recovered crystalline solids. The calcination step may be carried out directly on the recovered crystalline solids (in whole or in part) to produce a soda ash product, or the recovered crystalline solids (in whole or in part) may be subjected to further processing, e.g., drying to remove free water, prior to calcination to obtain the ultimate soda ash product.

Regardless of whether or not the coarse or large sodium carbonate monohydrate crystals are separated from the mixture of co-crystallized sodium carbonate monohydrate and sodium sesquicarbonate, the centrifuged or otherwise separated crystalline solids may be introduced into a calciner to convert the sodium carbonate monohydrate and sodium sesquicarbonate to sodium carbonate. Such rotary or fluid bed calciners are well known to those skilled in the soda ash art. The calcined product is a free-flowing soda ash whose density is typically less than the dense soda ash obtained from the calcination of pure sodium carbonate monohydrate.

In the soda ash recovery process of the present invention, the soda ash product obtained from calcination of the mixed sodium carbonate monohydrate and sodium sesquicarbonate may be processed further to produce sodium carbonate monohydrate, which is then calcined to produce a refined dense soda ash product, having commercially-acceptable purity, size distribution and bulk density. Such sodium carbonate monohydrate may be obtained by introducing the calcined sodium carbonate into an aqueous medium to recrystallize the soda ash as sodium carbonate monohydrate alone as the stable solid phase.

To this end, the anhydrous sodium carbonate from calcining mixed sodium carbonate monohydrate and sodium sesquicarbonate may be introduced into an aqueous suspension containing sodium carbonate monohydrate crystals, which are relatively pure and are the sole (only) stable solid phase in equilibrium with the aqueous liquor of the suspension, the liquor being essentially saturated with respect to sodium carbonate monohydrate. Introduction of the calcined sodium carbonate into this sodium carbonate monohydrate slurry effects solubilization of the calcinate, an anhydrous sodium carbonate, and its conversion into crystalline sodium carbonate monohydrate, which may then be recovered from the suspension. This so-called "reversion" process, in which the sodium carbonate calcinate is converted into sodium carbonate monohydrate, requires the addition of water to the slurry of sodium carbonate monohydrate in an amount equivalent to the hydrated water present in the sodium carbonate monohydrate recovered from the reversion slurry and also present in the purge liquor, to maintain the material balance. The purge liquor serves to remove impurities, e.g., sodium chloride and sodium sulfate, that may be present in the crystalline feed that would otherwise accumulate in the aqueous liquor and eventually interfere with the quality of sodium carbonate monohydrate being crystallized.

Still another technique for converting the sodium carbonate calcinate into sodium carbonate monohydrate involves direct hydration of the essentially anhydrous sodium carbonate, e.g., in a rotary hydrator. In this technique, the hydration of the calcined sodium carbonate may be carried out by spraying or otherwise contacting water with the calcined sodium carbonate in a hydrator to effect hydration of the sodium carbonate into sodium carbonate monohydrate. The porosity of the calcined product made from the calcination of the crystal mixture of sodium sesquicarbonate and sodium carbonate monohydrate facilitates direct hydration of the calcined product into sodium carbonate monohydrate via this technique. Such sodium carbonate monohydrate may then be calcined to produce a dense soda ash product.

The sodium carbonate monohydrate prepared in this manner may then be calcined to remove the hydrated water and produce soda ash as the desired product. The calcination of the sodium carbonate monohydrate may be carried out in a rotary calciner or a fluid bed calciner, e.g., operated at a temperature of about 110° C. to about 160° C. Soda ash prepared from sodium carbonate monohydrate is typically a dense soda ash. Such dense soda ash is typical of that produced via the conventional monohydrate process and generally has a bulk density in the range of about 55 to about 70 lbs/ft$^3$, (about 0.88 g/cm$^3$ to about 1.12 g/cm$^3$).

Figure 2:
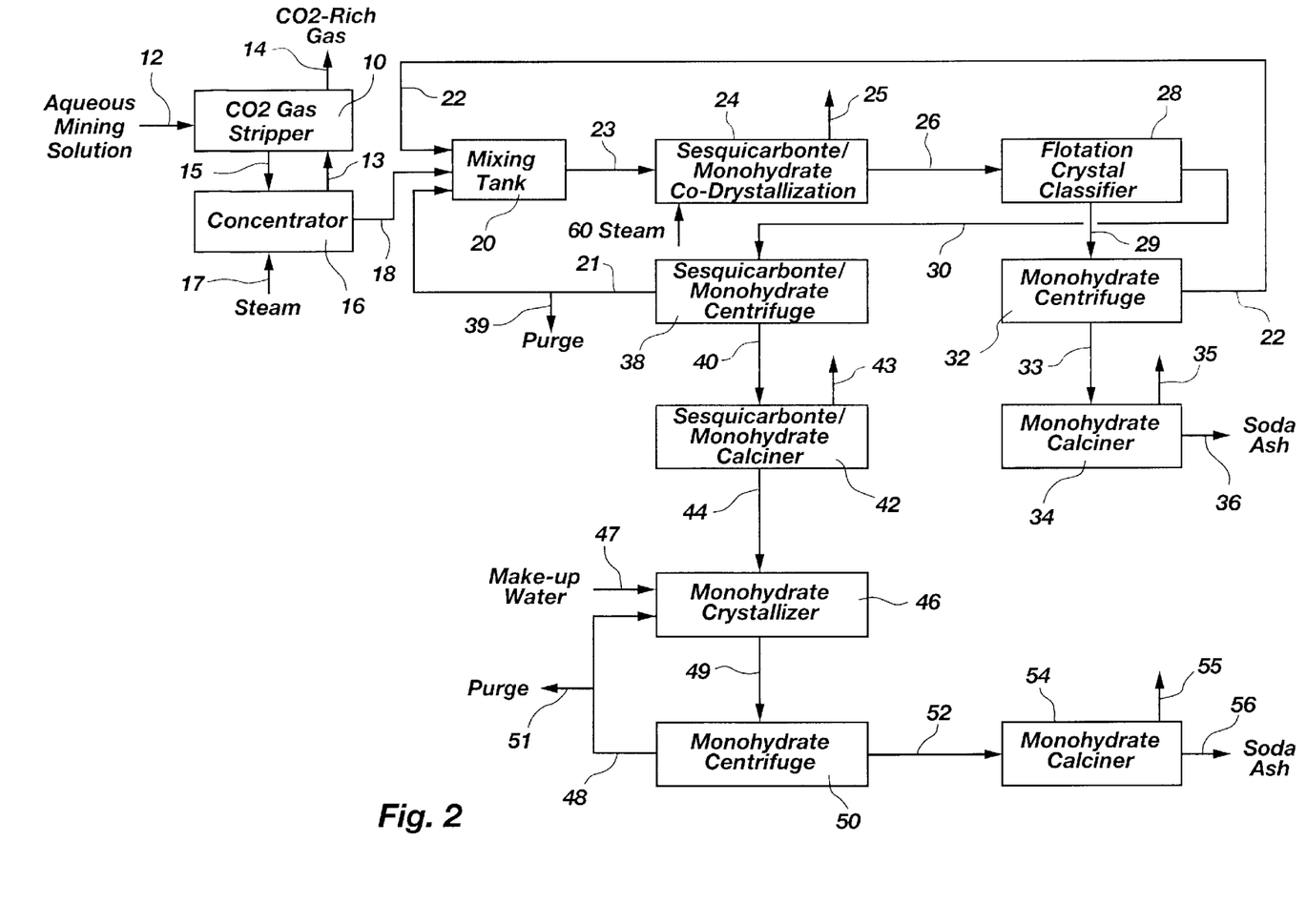
FIG. 2 is a schematic flow diagram depicting the steps and operations in producing dense soda ash from an aqueous mining solution, by the process of this invention.

FIG. 2 is a schematic flow diagram depicting the steps and operations in a preferred mode of carrying out the present invention for producing dense soda ash from an aqueous mining solution. Referring now to FIG. 2, an aqueous mining solution 12 is introduced into a $CO_2$ gas stripper 10. The aqueous mining solution 12 can be obtained by solution mining a subterranean trona ore deposit with an aqueous mining solvent such as water. The aqueous mining solution 12 is withdrawn from the region of the solution mining cavity at ambient temperature, about 20° to about 30° C., and typically has a concentration of about 4.5 wt % sodium bicarbonate and about 14 wt % sodium carbonate, along with about 0.2 wt % sodium chloride and about 0.05 wt % sodium sulfate. The aqueous mining solution 12 is preheated (preheating step not shown) to a temperature of about 110° C. prior to being introduced into the $CO_2$ gas stripper 10.

The $CO_2$ gas stripper 10 is a multistage countercurrent stripping column, in which aqueous mining solution 12 is introduced at the top of the column where it flows downwards in contact with an upward flowing $CO_2$ gas stripping inlet stream 13 that is introduced at the bottom of the column 10. A stream of $CO_2$-containing gas is withdrawn from the top of the column as stream 14, and this is preferably processed to recover a $CO_2$-rich gas by condensation of water in the exiting gas stream 14. Sufficient $CO_2$ gas is removed from the aqueous mining solution 12 to yield a solution stream 15 exiting from the $CO_2$ gas stripper 10 that contains about 3.4 wt % $NaHCO_3$ and about 14.7 wt % $Na_2CO_3$.

As shown in FIG. 2, the $CO_2$ gas stripper effluent stream 15 is introduced into an evaporative concentrator 16, which concentrates the introduced solution 15 and also strips additional $CO_2$ from the solution during such concentration. The concentrator is operated at a temperature of about 109° C., and steam 17 is introduced into a heat exchanger in evaporative concentrator 16 to provide indirect heating. Steam 13 from the concentrator 16 is introduced as the inlet stripping gas 13 into the stripper column 10.

The concentrated liquor stream 18 that is withdrawn from the concentrator 16 contains about 3.6 wt % $NaHCO_3$, about 23.7 wt % $Na_2CO_3$, about 0.31 wt % NaCl and about 0.08 wt % $Na_2SO_4$. As compared with the aqueous mining solution 10, the concentrated, stripped solution 18 contains only about 52% of the sodium bicarbonate content originally present in the aqueous mining solution 12.

The concentrated solution 18 is introduced to a mixing tank 20, where it is mixed with recycle streams 21 and 22 which are recycled mother liquor streams (discussed in more detail below). The hot mixed liquor stream 23 exits from the mixing tank 20 and contains about 3.5 wt % $NaHCO_3$, about 24 wt % $Na_2CO_3$, about 1.76 wt % NaCl and about 0.44 wt % $Na_2SO_4$.

The mixed liquor 23 is introduced into a co-crystallizer 24 in which sodium sesquicarbonate and sodium carbonate monohydrate are co-crystallized at a temperature of about 93° C., heat being provided via steam 60, and evaporated water (steam) is withdrawn as stream 25. The aqueous crystallizer slurry 26 that is withdrawn from the co-crystallizer 24 contains about 30 wt % solids and has a mother liquor whose composition is about 3.3 wt % $NaHCO_3$, about 24.5 wt % $Na_2CO_3$, about 4.1 wt % NaCl and about 1.0 wt % $Na_2SO_4$. Recycle streams 21 and 22, which are introduced to mixing tank 20 along with the concentrated, $CO_2$-stripped steam 18, have compositions identical to the mother liquor.

Aqueous crystallizer slurry 26 contains large crystals of sodium carbonate monohydrate in admixture with smaller sodium carbonate monohydrate crystals and sodium sesquicarbonate crystals and is introduced into a hydraulic crystal classifier 28 in which the upward flow of liquid in the hydraulic classifier 28 is sufficient to effect separation of the small sodium carbonate monohydrate crystals and essentially all sodium sesquicarbonate crystals from the larger sodium carbonate monohydrate crystals. A slurry stream 29 containing large sodium carbonate monohydrate crystals but essentially no sodium sesquicarbonate crystals is withdrawn from the bottom of the flotation classifier 28. A separate stream 30 containing smaller sodium carbonate monohydrate crystals and essentially all of the sodium sesquicarbonate crystals is withdrawn from the top of the flotation classifier 28. Slurry stream 29 can be preconcentrated in a hydroclone (not shown in drawing) before being fed to a monohydrate centrifuge 32 to separate the mother liquor 22 from the large sodium carbonate monohydrate crystals 33, and the mother liquor stream 22 is recycled to mixing tank 20. The separated wet cake solids 33 are introduced to a monohydrate calciner 34 operated at elevated temperature, to remove the water of hydration from the crystalline sodium carbonate monohydrate in the wet cake solids 33. Anhydrous soda ash 36, a dense soda ash product, exits the calciner 34 along with by-product waste gases 35.

As shown in FIG. 2, crystal slurry stream 30, containing a mixture of smaller sodium carbonate monohydrate crystals and essentially all of the sodium sesquicarbonate crystals, is introduced to a sesquicarbonate/monohydrate centrifuge 38 to separate the solids as a wet cake 40 from the mother liquor 21. The mother liquor stream 21 is recycled to mixing tank 20, and a purge stream 39 is withdrawn from the recycled mother liquor 21 to control the build-up of sodium chloride and sodium sulfate impurities in the co-crystallizer 24.

The separated wet cake 40 is introduced to a sesquicarbonate/monohydrate calciner 42, in which the sodium sesquicarbonate and sodium carbonate monohydrate are converted at elevated temperature to essentially anhydrous soda ash by removal of water and $CO_2$ as a by-product gas stream 43.

The calcinate solids stream 44, containing essentially anhydrous soda ash, is introduced into a monohydrate crystallizer 46 which contains a slurry of sodium carbonate monohydrate in an aqueous medium, at a concentration of about 30 wt % solids and at a temperature of at least about 85° C., up to a temperature within about 2° C. of the temperature at which anhydrous sodium carbonate is an equilibrium solid phase. The introduced calcinate 44 is solubilized and recrystallized in the monohydrate crystallizer 46 as essentially pure sodium carbonate monohydrate. Make-up water 47 is introduced to the monohydrate crystallizer 46 to maintain the overall water balance. Aqueous slurry 49 containing sodium carbonate monohydrate crystals in a mother liquor is introduced to a monohydrate centrifuge 50 which separates the crystalline solids into a wet cake stream 52 and a mother liquor stream 48. The mother liquor stream 48 is recycled to the monohydrate crystallizer 46, and a portion of the recycled mother liquor 48 is withdrawn and discarded as a purge 51, to control the build-up of impurities in the crystallizer 46. Alternatively, purge 51 may be recycled (not shown in drawing) to mixing tank 20 to enhance the process alkali recovery efficiency. The mother liquor 48 from the monohydrate crystallizer has a composition of about 28.75 wt % $Na_2CO_3$, 3 wt % NaCl and 0.75 wt % $Na_2SO_4$ (and essentially no sodium bicarbonate).

The wet cake 52 from the monohydrate centrifuge 50 is introduced into a monohydrate calciner 54 to remove the water of hydration from the crystalline sodium carbonate monohydrate, which exits the calciner 54 as by-product exhaust gases 55, and to convert the monohydrate wet cake to essentially anhydrous soda ash 56, which is the desired dense soda ash product.

The present invention will now be described and explained further, by reference to the following specific, illustrative, non-limiting Examples.

EXAMPLE 1

Co-crystallization of Sodium Carbonate Monohydrate and Sodium Sesquicarbonate

A continuous laboratory-scale crystallization was carried out in which sodium carbonate monohydrate and sodium sesquicarbonate were co-crystallized from an aqueous feed solution containing 22.0 wt % $Na_2CO_3$, 2.7 wt % $NaHCO_3$, 1.73 wt % NaCl and 0.39 wt % $Na_2SO_4$. This composition is representative of an aqueous mining solution obtained from solution mining of trona ore, where the solution has been subjected to $CO_2$ stripping, concentration via evaporation, and combination with recycled crystallizer mother liquor. The feed solution was prepared by dissolving in water appropriate amounts of Grade 100 soda ash (a commercial grade of soda ash available from FMC Corporation, Philadelphia, Pa.), Grade 800 sodium sesquicarbonate (a commercial grade of sodium sesquicarbonate available from FMC Corporation, Philadelphia, Pa.) and reagent grade sodium chloride and sodium sulfate. A crystallizer slurry was prepared and introduced into the crystallizer at the beginning of the run, and this was made by suspending sodium carbonate monohydrate crystals and sodium sesquicarbonate crystals in sufficient feed solution to make a slurry containing about 25 wt % solids, at a temperature of about 93° C.

The crystallizer was a 2-liter round bottom glass jacketed resin kettle having a slurry discharge port. Thin metal baffles were inserted to enhance mixing, and stirring was accomplished with a Lightnin® mixer (Lightnin, Rochester, N.Y., U.S.A.), operated at a stirring speed of 500 rpm. Water evaporated from the crystallizer slurry during crystallization was condensed and collected in a round bottom receiver flask immersed in dry ice.

During crystallization, the crystallizer slurry was maintained at an average temperature of 93° C. and at a pressure of 630 mm Hg. Approximately one-third of the crystallizer slurry contents in the crystallizer was removed each hour, and feed solution was introduced to the crystallizer at a rate that provided an average residence time within the crystallizer of about 3 hours. The concentration of solids in the crystallizer slurry averaged about 25–26 wt %.

Crystallizer slurry samples that were removed from the crystallizer were fed into a centrifuge, and the resultant centrifuge cakes were washed with acetone to facilitate crystal drying (by air drying) and to minimize agglomeration of the crystallized solids.

The crystallizer was operated in this fashion for about 7 hours per day, at an average crystallization temperature of about 93° C., and was idled overnight without vacuum at a temperature of about 85° C. with stirring at 500 rpm.

The crystallizer was operated for a sufficient time to provide seven complete turnovers within the crystallizer. Evaluation of the crystal size distribution in the crystallized mixture of sodium carbonate monohydrate and sodium sesquicarbonate indicated that steady state operation of the crystallizer had been achieved prior to the seventh turnover. Analysis of the mother liquor in the crystallizer during steady state operation showed that the mother liquor contained 24.5 wt % $Na_2CO_3$, 3.3 wt % $NaHCO_3$, 4.12 wt % NaCl and 0.93 wt % $Na_2SO_4$.

The dried crystalline solids recovered at the end of the crystallization run were granular, free-flowing solids. Analysis of the crystalline solids showed that 80 wt % of the total alkali content of the solids was sodium carbonate monohydrate, with the balance being sodium sesquicarbonate. The bulk density measured for the mixture of crystallized solids was 51 lb/ft$^3$ (0.82 g/cm$^3$). Analysis of the particle size distribution of the crystalline solids showed that 58 wt % was retained on a 40 mesh sieve (420 micron), 29 wt % passed through the 40 mesh sieve and was retained on a 100 mesh sieve (149 micron), 9 wt % passed through the 100 mesh sieve and was retained on a 325 mesh sieve (44 micron), and 4% was fines that passed through a 325 mesh sieve (all sieves were U.S. Sieve Series).

Results and operating parameters for the crystallization carried out in this Example 1 are summarized in the Table shown below. The Table also shows results for Examples 2 and 3, described below, which were carried out in a manner similar to that of Example 1.

TABLE

| EXAMPLE | | ANALYSES OF CRYSTALLIZER FEED SOLUTION (FEED) AND CRYSTALLIZER MOTHER LIQUOR (ML) | | | | ANALYSES OF CRYSTALLIZER SOLIDS Crystal Sizing | | | | | Amount of Total Alkali Content that is |
|---|---|---|---|---|---|---|---|---|---|---|---|
| | | $Na_2CO_3$ (wt %) | $NaHCO_3$ (wt %) | NaCl (wt %) | $Na_2SO_4$ (wt %) | +40 mesh (wt %) | −40 +100 (wt %) | −100 +325 (wt %) | −325 mesh (wt %) | Bulk Density (lb/ft$^3$) | $Na_2CO_3.H_2O$ (wt %) |
| 1 | Feed: | 22.0 | 2.7 | 1.73 | 0.39 | 58 | 29 | 9 | 4 | 51 | 80 |
| | ML: | 24.5 | 3.3 | 4.12 | 0.93 | | | | | | |
| 2 | Feed: | 19.6 | 4.5 | 1.7 | 0.39 | 22 | 54 | 23 | 1 | 30 | 34 |
| | ML: | 25.8 | 3.3 | 3.23 | 0.74 | | | | | | |
| 3 | Feed: | 20.7 | 2.7 | 3.7 | 0.36 | 30 | 59 | 10 | 1 | 49 | 74 |
| | ML: | 20.7 | 3.0 | 8.06 | 0.78 | | | | | | |

EXAMPLE 2

Sodium Carbonate Monohydrate and Sodium Sesquicarbonate Co-Crystallization Using High Bicarbonate Feed Solution The laboratory-scale continuous crystallization described for this Example 2 demonstrates the co-crystallization of sodium carbonate monohydrate and sodium sesquicarbonate using a feed solution that was relatively high in bicarbonate content, 4.5 wt % $NaHCO_3$, as compared to the feed solution used in Example 1 which contained 2.7 wt % $NaHCO_3$. The high bicarbonate content feed solution used in this Example is representative of an aqueous mining solution in which the sodium bicarbonate content has not been extensively converted to sodium carbonate by $CO_2$ gas stripping. The conditions used in this Example 2 were identical to those described for Example 1, except for the high bicarbonate feed solution used in this Example.

The feed solution used in Example 2 contained 19.6 wt % $Na_2CO_3$, 4.5 wt % $NaHCO_3$, 1.7 wt % NaCl and 0.39 $Na_2CO_3$. Analysis of the mother liquor in the crystallizer, once steady state operation had been achieved, was as follows: 25.8 wt % $Na_2CO_3$, 3.3 wt % $NaHCO_3$, 3.23 wt % NaCl and 0.74 wt % $Na_2SO_4$.

The resulting dried crystalline solids were granular and free-flowing but exhibited a particle size analysis that contained a reduced amount of +40-mesh crystals, as compared with the product from Example 1. Crystal size analysis of the dried solids at the end of the crystallization run gave the following particle size distribution: 22 wt % +40 mesh; 54 wt % −40 +100 mesh; 23 wt % −100 +325 mesh; and 1 wt % fines passing through the 325 mesh sieve. Bulk density of the granular free-flowing dried solids was 30 lb/ft$^3$ (0.48 g/cm$^3$). Analysis of the crystalline product indicated that 34% of the total alkali content was sodium carbonate monohydrate.

Operating parameters and results for the crystallization carried out in Example 2 are summarized in the Table above. The results indicate that the presence of the higher bicarbonate content in the feed solution caused the percentage of sodium carbonate monohydrate in the crystallized solids to be significantly reduced, as compared with the sodium carbonate monohydrate content of the crystallized product from Example 1 whose feed solution contained substantially less bicarbonate.

EXAMPLE 3

Co-Crystallization of Sodium Carbonate Monohydrate and Sodium Sesquicarbonate from a High Salt Feed Solution The continuous crystallization described for this Example 3 demonstrates the co-crystallization of sodium carbonate monohydrate and sodium sesquicarbonate in a laboratory-scale crystallizer using a feed solution that was relatively high in sodium chloride content, 3.7 wt % NaCl, as compared to the feed solution used in Example 1 which contained 1.73 wt % NaCl. The high sodium chloride content feed solution used in this Example is representative of an aqueous mining solution in which the trona ore deposit being solution mined is contaminated with sodium chloride. The conditions used in this Example 3 were identical to those described for Example 1, except for the high sodium chloride content feed solution used in this Example.

The feed solution used in this Example 3 contained 20.7 wt % $Na_2CO_3$, 2.7 wt % $NaHCO_3$, 3.7 wt % NaCl and 0.36 $Na_2CO_3$. Analysis of the mother liquor in the crystallizer, once steady state operation had been achieved, was as follows: 20.7 wt % $Na_2CO_3$, 3.0 wt % $NaHCO_3$, 8.06 wt % NaCl and 0.78 wt % $Na_2SO_4$.

The resulting dried crystalline solids were granular and free-flowing but exhibited a particle size analysis that contained a reduced amount of +40-mesh crystals, as compared with the product from Example 1. Crystal size analysis of the dried co-crystallized solids at the end of the crystallization run gave the following particle size distribution: 30 wt % +40 mesh; 59 wt % −40 +100 mesh; −10 wt % −100 +325 mesh; and 1 wt % fines passing through the 325 mesh sieve. Bulk density of the granular free-flowing dried solids was 49 lb/ft$^3$ (0.78 g/cm$^3$), comparable to that obtained for the product in Example 1. Analysis of the crystalline product indicated that 74% of the total alkali content was sodium carbonate monohydrate, comparable to that obtained for the product in Example 1.

Operating parameters and results for the crystallization carried out in Example 3 are summarized in the Table above. The results indicate that the presence of a high sodium chloride content in the feed solution did not result in any adverse change in the sodium carbonate monohydrate content present in the crystallized solids, as compared with the monohydrate content of the crystallized product from Example 1 whose feed solution contained substantially less sodium chloride. The only significant difference noted is that the size fraction of +40 mesh crystals was reduced in this Example 3, as compared to that of Example 1, even though the percentage of sodium carbonate monohydrate in the products of both Examples was comparable.

The preceding specific embodiments are illustrative of the practice of the invention. The present invention may be embodied in other specific forms without departing from the spirit or essential attributes thereof and, accordingly, reference is made to the appended claims, rather than the foregoing specification, as indicating the scope of the invention.

What is claimed is:

1. A process for the production of sodium carbonate-containing crystalline solids which comprises:
   (i) withdrawing an aqueous mining solution containing dissolved sodium carbonate and at least about 1 wt % sodium bicarbonate from an underground alkali ore source;
   (ii) stripping $CO_2$ gas from the withdrawn aqueous mining solution, to convert a portion of said sodium bicarbonate dissolved therein to sodium carbonate to provide a sodium carbonate concentration such that a resulting crystallization step provides crystals of both sodium carbonate monohydrate and sodium sesquicarbonate crystals wherein greater than one-fourth the total alkalinity of said crystals is from said monohydrate crystals;
   (iii) co-crystallizing sodium carbonate monohydrate and sodium sesquicarbonate crystalline solids from the $CO_2$-stripped aqueous mining solution at a temperature below the invariant point of said stripped solution to avoid co-crystallization of anhydrous sodium carbonate, by evaporation of water at a temperature of at least about 50° C. and below said invariant point of said stripped solution to form a slurry of crystalline solids in an aqueous liquor wherein said sodium carbonate monohydrate crystals are present in an amount greater than one-fourth of the total alkalinity of said crystals;
   (iv) recovering said sodium carbonate monohydrate and sesquicarbonate crystalline solids from said slurry.

2. The process of claim 1 which further comprises separating the crystalline solids into at least two different crystal size fractions.

3. The process of claim 1 which further comprises separating large crystals of sodium carbonate monohydrate, by crystal size separation, from small crystals of sodium carbonate monohydrate and from small crystalline sodium sesquicarbonate in the said crystalline solids.

4. The process of claim 1 which further comprises calcining crystalline solids to produce soda ash.

5. The process of claim 1 wherein the underground alkali source is selected from the group consisting of trona, nahcolite and wegscheiderite.

6. The process of claim 1 wherein the aqueous mining solution contains a total alkali content, expressed as $Na_2CO_3$, of sodium carbonate and sodium bicarbonate of at least about 8 wt % $Na_2CO_3$.

7. The process of claim 6 wherein the aqueous mining solution contains at least about 6 wt % sodium carbonate and from about 2 wt % to about 8 wt % sodium bicarbonate dissolved therein.

8. The process of claim 6 wherein the aqueous mining solution further contains sodium chloride dissolved therein in an amount of up to about 8 wt %.

9. The process of claim 1 wherein the $CO_2$ stripping step is operated at a temperature of from about 50° C. to about 140° C.

10. The process of claim 1 wherein $CO_2$ gas is stripped from the aqueous mining solution by countercurrent multi-stage contact of the aqueous mining solution with a water vapor gas stream.

11. The process of claim 10 which further comprises recovering a $CO_2$-rich gas from the $CO_2$ stripping step, by condensing and separating water from a $CO_2$-containing exit gas stream from the $CO_2$ stripping step.

12. The process of claim 1 which further comprises concentrating the withdrawn aqueous mining solution, prior to the co-crystallization step, by evaporation of water at a temperature of at least about 50° C., without crystallization of sodium carbonate or sodium bicarbonate dissolved therein.

13. The process of claim 12 wherein the concentration step and $CO_2$ stripping step are carried out as continuous sequential operations in which the $CO_2$ stripping step is carried out before the concentration step.

14. The process of claim 13 wherein $CO_2$ gas is stripped from the aqueous mining solution by countercurrent multi-stage contact of the aqueous mining solution with a water vapor gas stream from the concentration step.

15. The process of claim 12 wherein the concentration step and $CO_2$ stripping step are carried out as a single step.

16. The process of claim 1 wherein the $CO_2$ stripping step and the co-crystallization step are carried out as a single operation.

17. The process of claim 1 wherein the co-crystallization of sodium carbonate monohydrate and sodium sesquicarbonate from said stripped solution is carried out at a temperature of about 70° C. to about 100° C. provided that said about 100° C. temperature is below the invariant point for said stripped solution.

18. The process of claim 1 wherein the combined crystals of crystalline sodium carbonate monohydrate and crystalline sodium sesquicarbonate has a total alkali content in which sodium carbonate monohydrate is at least about one-half of the total alkali content in the crystallized solids.

19. The process of claim 12 wherein the mixture of crystalline sodium carbonate monohydrate and crystalline sodium sesquicarbonate has a total alkali content in which sodium carbonate monohydrate is at least about one-half of the total alkali content in the crystallized solids.

20. The process of claim 1 wherein sufficient $CO_2$ is stripped from the aqueous mining solution to convert at least about 10% of the sodium bicarbonate in the aqueous mining solution to sodium carbonate prior to co-crystallization of sodium carbonate monohydrate and sodium sesquicarbonate.

21. The process of claim 1 wherein sufficient $CO_2$ is stripped from the aqueous mining solution to convert at least about 20% of the sodium bicarbonate in the aqueous mining solution to sodium carbonate prior to co-crystallization of sodium carbonate monohydrate and sodium sesquicarbonate.

22. The process of claim 4 which further comprises introducing the soda ash into an aqueous medium to recrystallize the soda ash as sodium carbonate monohydrate, recovering the crystalline sodium carbonate monohydrate, and calcining the recovered sodium carbonate monohydrate to produce a dense soda ash product.

23. The process of claim 4 which further comprises introducing the soda ash into an aqueous suspension containing crystalline sodium carbonate monohydrate as a sole stable solid phase in equilibrium with the aqueous liquor of the suspension, to effect solubilization and conversion of the soda ash into crystalline sodium carbonate monohydrate, recovering crystalline sodium carbonate monohydrate from the suspension, and calcining the recovered sodium carbonate monohydrate to produce a dense soda ash.

24. The process of claim 4 which further comprises converting the soda ash to sodium carbonate monohydrate in a hydrator and thereafter calcining such sodium carbonate monohydrate to produce a dense soda ash.

25. A process for the production of sodium carbonate crystalline solids which comprises:

(i) withdrawing an aqueous mining solution containing at least about 1 wt % dissolved sodium bicarbonate from an underground alkali source;

(ii) converting at least a portion of said dissolved sodium bicarbonate to sodium carbonate in said aqueous mining solution to provide a modified mining solution containing increased sodium carbonate content in relation to the remaining sodium bicarbonate content in said modified mining solution such that upon evaporative crystallization of said modified mining solution crystals of sodium carbonate monohydrate and crystals of sodium sesquicarbonate are precipitated to provide combined crystals in which greater than about one-fourth the total alkalinity of said combined crystals is sodium carbonate monohydrate crystals, said converting of sodium bicarbonate to sodium carbonate comprises removing $CO_2$ gas from said aqueous mining solution;

(iii) co-crystallizing sodium carbonate monohydrate crystals and sodium sesquicarbonate crystals in bimodal form from said modified mining solution containing increased sodium carbonate content below the invariant point of said modified mining solution to avoid co-crystallization of anhydrous sodium carbonate, by evaporation of water at a temperature of at least about 50° C. and below said invariant point of said modified mining solution to form a slurry of crystalline solids in an aqueous mother liquor wherein at least a portion of said monohydrate crystals are significantly larger than the sesquicarbonate crystals;

(iv) separating said crystalline solids from the mother liquor and recovering said crystalline solids.

26. The process of claim 25 wherein removing $CO_2$ is performed by stripping.

27. The process of claim 25 wherein removing $CO_2$ is performed by stripping and/or concentrating.

28. The process of claim 25 wherein the concentration of $NaHCO_3$ in said aqueous mining solution is greater than approximately 3% by weight.

29. The process of claim 25 wherein mother liquor from step (iv) is admixed with said aqueous mining solution.

30. The process of claim 25, wherein said underground alkali source is trona.

* * * * *